Jan. 26, 1932.                C. H. BRUNNER                1,842,537
          CONTROL MECHANISM FOR HYDRAULIC DREDGING APPARATUS
                        Filed March 18, 1931
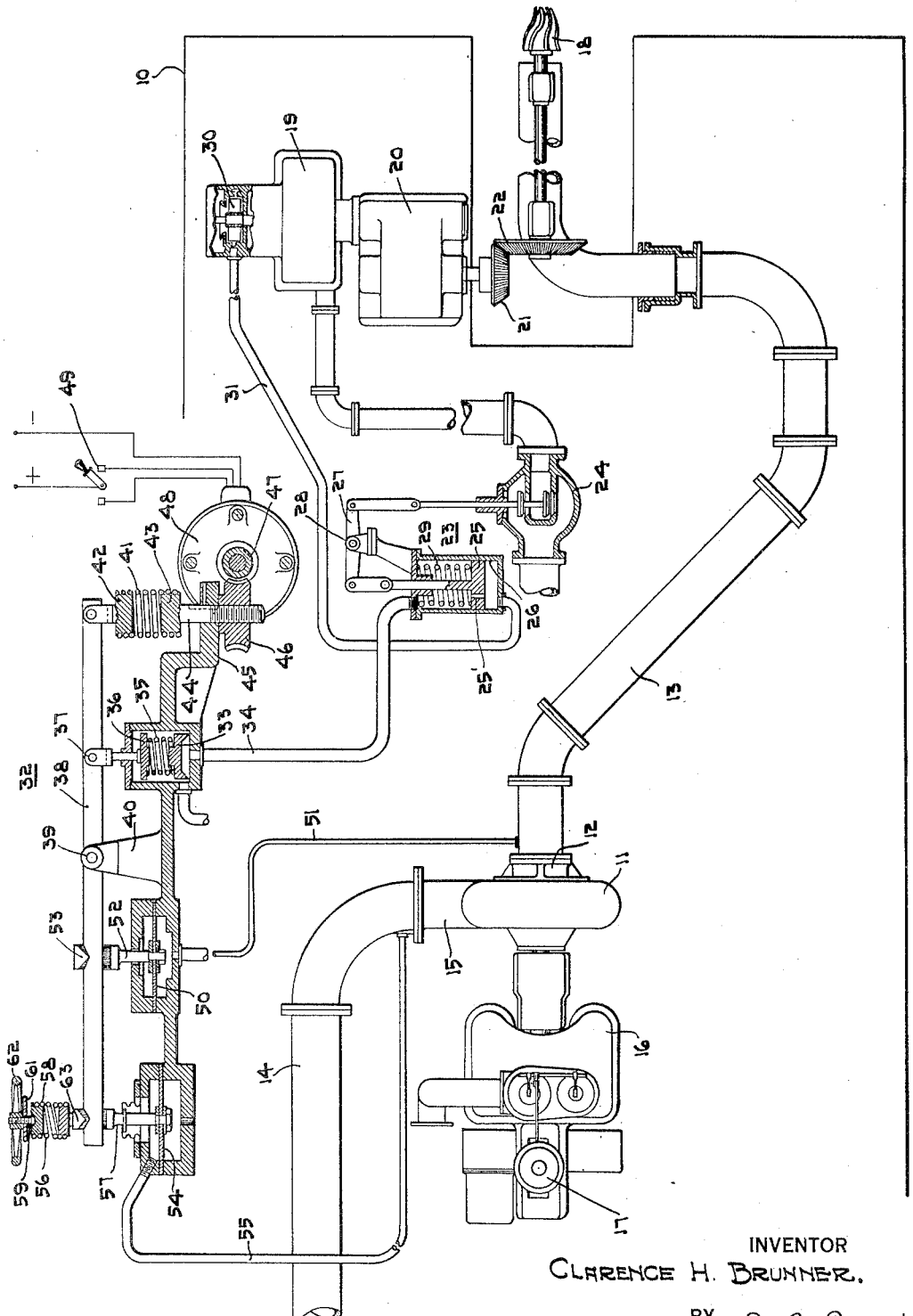
INVENTOR
CLARENCE H. BRUNNER.
BY  A. B. Reavis
                    ATTORNEY Patented Jan. 26, 1932

1,842,537

UNITED STATES PATENT OFFICE

CLARENCE H. BRUNNER, OF OAKLAND, CALIFORNIA, ASSIGNOR TO WESTINGHOUSE ELECTRIC & MANUFACTURING COMPANY, A CORPORATION OF PENNSYLVANIA

CONTROL MECHANISM FOR HYDRAULIC DREDGING APPARATUS

Application filed March 18, 1931. Serial No. 523,581.

My invention relates to a control mechanism for hydraulic dredging apparatus including a dredge pump and a cutter or other means for loosening the material being dredged, and it has for its object to provide a control mechanism which will effect improved operation of the dredging apparatus.

It is a more particular object to avoid wide variations in vacuum or pressure in the conduits of the dredging apparatus, and to avoid plugging of the conduits by too heavy concentrations of solid material in the mixture of water and solid material being pumped through said conduits.

In the operation of hydraulic dredges having cutters, considerable difficulty is experienced on account of the great variations in the amount of solid material loosened by the cutter and received in the intake conduit. As the cutter is submerged under water, the operator cannot see the material into which the cutter is digging, and therefore, cannot regulate its action. When the cutter loosens the material too rapidly, too great a concentration of solid material in the mixture of water and solid material results in the intake conduit and the pump discharge conduit. This condition is also experienced when the cutter gets into heavy dense clay banks.

Such increases in concentration cause wide variations in vacuum on the suction side of the dredge pump and in pressure on the discharge side of the pump, due to the increased pipe friction, frequently resulting in plugging of one of the conduits. The plugging of the intake conduit increases the vacuum to an extent causing air entrainment and destroying the vacuum. This means that the whole operation must be stopped and the dredge pump must be primed before operation can be resumed. The voids or air pockets caused by the wide variations in vacuum on the inlet or suction side of the dredge pump impose extremely heavy duty on the pump, requiring heavy maintenance.

In accordance with my invention, I provide a control mechanism which effects substantially uniform concentration of the material in the intake conduit by controlling the action of the cutter in response to pressure in one of the conduits, preferably in response to the vacuum, or absolute pressure, in the intake conduit. As the concentration of the material in the intake conduit increases, increasing the tendency to plugging of the conduit and raising the vacuum at the inlet of the pump, the speed of the cutter is reduced in response to the increase in vacuum. A reduced amount of solid material is loosened, thereby restricting the increase in concentration and vacuum.

The above and other objects are effected by my invention, as will be apparent from the following description and claims taken in connection with the accompanying drawing, forming a part of this application, in which:

The single figure is a diagrammatic view of the control mechanism applied to dredging apparatus, the latter being shown in plan.

Referring now to the drawing more in detail, I show, at 10, a partial outline of a dredge boat on which hydraulic dredging apparatus is installed. The latter includes a dredge pump 11, having an inlet opening 12 to which an intake conduit 13 is connected. A discharge conduit 14 is connected to the discharge opening 15 of the pump. The pump 11 is driven at substantially constant speed by any suitable means, for example, a turbine 16 whose speed is regulated by a governor 17.

Associated with and disposed adjacent the mouth of the intake conduit 13 is a cutter 18 for loosening the material to be dredged. The mouth of the intake conduit and the cutter are arranged to be lowered below the surface of the water to the material to be dredged. The cutter is driven by a turbine 19 through reduction gearing 20 and bevel gears 21 and 22. The turbine 19 is provided with a speed-responsive governor 23 which actuates the admission valve 24 controlling the admission of motive fluid to the turbine 19.

The governor 23 includes a piston 25 disposed in a cylinder 26 and connected to the valve 24 through a lever 27 fulcrumed at 28. A spring 29 biases the piston 25 in valve opening direction. An impeller 30, provided on the shaft of the turbine 19, provides a fluid pressure varying as the square of the speed of the turbine, which fluid pressure is conveyed through a conduit 31 to the cylinder 26 and imposed on the piston 25 in valve closing direction. A restricted flow of fluid into the upper end of the cylinder is provided, preferably by an orifice 25' in the piston 25, for providing a controlling fluid pressure on the upper side of the piston 25.

The governor 23 actuates the admission valve 24 in response to the speed of the turbine in the ordinary manner of a fluid pressure governor. Upon increase in speed of the turbine, the increased fluid pressure provided by the impeller actuates the piston 25 to move the admission valve in closing direction. Upon a decrease in speed of the turbine, the decreased fluid pressure permits the spring 29 to move the piston 25 in valve-opening direction, providing increased admission of motive fluid.

In order to vary the speed of the cutter so as to maintain a substantially uniform concentration of the material drawn into the intake conduit 13, I provide a control mechanism, indicated generally by the numeral 32, for reducing the speed of the turbine 19 and the cutter 18 in response to decrease in pressure in the conduit 13, or, what is the same thing, an increase in vacuum in the conduit 13.

The controlling mechanism 32 includes a pressure relief valve 33, which controls the discharge of fluid from the upper end of the cylinder 26, conveyed through a conduit 34, and thereby controls the pressure of the fluid above the piston 25. The valve 33 is biased to closed position by a compression spring 35, interposed between the valve and a spring abutment 36. The latter is pivoted at 37 to a lever 38, which is fulcrumed at 39 to a stationary bracket 40. The lever 38 is biased in clockwise direction by a tension spring 41, connected at one end to a spring nut 42 pivoted to the lever 38 and at its other end to a stationary spring nut 43.

In order to vary the setting of the control mechanism, provision is made for vertical adjustment of the spring nut 43 which carries a stem 44 extending through an opening in a stationary bracket 45. A worm gear 46 is screw-threaded on the lower end of the stem 44 and abuts against the bracket 45 to limit the upward movement of the spring nut 43. The worm gear 46 engages a worm 47 carried and rotated by the shaft of an electric motor 48. The motor 48 is, preferably, a split-field series motor of the type used for operating turbine governor speed changers, and is controlled by a double-throw switch 49 adapted to control rotation of the motor 48 in either direction. The switch 49 is preferably located on the operating bridge of the dredge boat.

The control mechanism 32 further includes a diaphragm 50, responsive to the pressure in the intake conduit 13, which is communicated to the under side of the diaphragm through a conduit 51. The diaphragm 50 may also be considered as responsive to the pressure within the inlet of the pump 11, since said pressure is substantially the same as that in the adjacent end of the conduit 13. The upper side of the diaphragm is subjected to atmospheric pressure. Inasmuch as the pressure within the conduit, at least in the usual case, is below atmospheric pressure, the diaphragm 50 is biased downwardly by atmospheric pressure, which bias is transmitted to the lever 38 by a stem 52 having a knife edge 53 bearing downwardly on the left-hand arm of the lever.

The control mechanism may be further provided with a diaphragm 54, which is subjected on its upper side to the pressure in the discharge conduit 14, communicated through a conduit 55. A tension spring 56, connected to the diaphragm 54 through a stem 57, opposes the force of the fluid pressure on the diaphragm. The upper end of the spring is attached to a spring-holding member 58, having a stem 59 extending through an opening in a stationary member 61. A hand wheel 62, bearing on the upper side of the stationary member 61, is screw-threaded on the stem 59. By rotating the hand wheel 62, the setting of the spring 56 may be varied.

The stem 57 has a knife-edge 63 adapted to bear against the lever 38 upon sufficient downward movement of the stem. The spring 56 is preferably adjusted to such a setting that, with normal discharge pressure in the conduit 14, the knife-edge 63 is slightly above the upper end of the normal range of movement of the left-hand arm of the lever 38. The diaphragm 54, therefore, when the discharge pressure is normal, does not effect the normal control of the control mechanism 32 by the vacuum in the conduit 13.

The operation of the above-described apparatus is as follows:

The pump 11 is operated at substantially constant speed by the turbine 16 and is adapted to pump a substantially constant quantity of mixture of water and solid material from the intake conduit 13 to the discharge conduit 14. The solid material to be dredged, for example, gravel, sand or silt, is loosened by the cutter 18. The speed of the cutter 18 is controlled so as to loosen a substantially constant amount of solid material which can be conveyed through the conduits without interruption. This regulation is accomplished as follows:

Assuming that too much solid material is being loosened, due to too rapid feeding of the cutter into the solid material or due to getting into heavier material. The increased proportion of solid material in the conduit 13 increases the resistance to flow, thereby decreasing the absolute pressure at the end adjacent the inlet of the pump or, in other words, increasing the vacuum thereof. The decrease in pressure is communicated by the conduit 51 to the under side of the diaphragm 50, which thereby moves the lever 38 in counter-clockwise direction against the force of the spring 41. The movement of the lever 38 effects a decrease in the compression of the spring 35, which in turn, decreases the closing force on the pressure relief valve 33. The latter consequently decreases the controlling fluid pressure above the piston 25.

The decrease in the controlling fluid pressure causes upward movement of the piston 25, which moves the admission valve 24 in closing direction. The speed of the turbine 19 decreases until the decreased pressure provided by the impeller 30 permits the piston 25 to move downwardly again to the point at which the valve 24 admits enough steam for driving the turbine 19.

In other words, the effect of the decrease in controlling fluid pressure is to lower the speed setting of the governor 23, by reducing the total force on the piston 25 opposing the impeller pressure, so as to effect a reduced speed of the turbine 19 and the cutter 18. A decreased amount of solid material is loosened, and a too heavy concentration of heavy material in the mixture conveyed through the conduits is avoided.

When the amount of solid material loosened by the cutter decreases beyond that which can be normally conveyed through the dredging apparatus, as when the cutter is not being fed so rapidly, or a somewhat heavy concentration in the intake conduit has been cleared, the resistance to flow of the mixture through the conduit 13 decreases, thereby raising the pressure adjacent the inlet 12 of the pump. The increased pressure is communicated to the diaphragm 50, which decreases the bias on the lever 38 in counter-clockwise direction. The spring 41 thereupon moves the lever in clockwise direction, increasing the compression of the spring 35 and the closing force of the pressure relief valve 33.

The valve 33 increases the controlling fluid pressure above the piston 25, moving the same downwardly in valve-opening direction. The speed of the turbine increases until the increased pressure developed by the impeller 30 again raises the piston 25. In this case, the increased controlling fluid pressure raises the speed setting of the governor 23, since increased impeller pressure at a higher speed is required to balance the same.

The cutter 18 now operates at increased speed, tending to loosen sufficient solid material to be conveyed through the conduits and the pump 11 of the dredging apparatus.

From the above description it will be seen that I have provided a control mechanism for so controlling the action of the cutter, or other loosening means which may be employed, that plugging of the intake or discharge conduits is avoided by reducing the quantity of solid material loosened as soon as there is any tendency to obstruction or plugging of the conduits, permitting a greater proportion of water to flow through the conduits to clear the same.

The regulation of the cutter in response to the vacuum or pressure in the intake conduit will provide a substantially uniform concentration of the mixture flowing therethrough. This means that the mixture flowing through the discharge conduit 14 will also be of substantially uniform concentration, so that plugging of the discharge conduit will also be avoided. However, to further guard against any possibility of plugging the discharge conduit 14, the diaphragm 54 may be employed. An increase in concentration of the material in the discharge conduit, tending to obstruct or plug the conduit increases the resistance to flow and increases the pressure adjacent the discharge opening 15 of the pump 11. The increase in pressure, which is communicated through the conduit 55, moves the diaphragm 54 and the knife-edge 63 downwardly. The knife-edge 63 contacts with the left-hand arm of the lever 38 and moves the lever in counter-clockwise direction, unless it has already been moved a sufficient amount in that direction by an increased vacuum.

The control mechanism 32 operates in the same manner as above described to effect decreased speed of the cutter 18. A greater proportion of water will flow through the conduits until the heavy concentration of solid material is removed and the mixture again flows freely through the discharge conduit. The decrease in pressure adjacent the discharge opening 15, accompanying the removal of the heavy concentration, will permit the lever 38 to be moved in clockwise direction by the spring 41, again increasing the speed of the cutter 18 in the same manner as above, provided that the vacuum has also decreased to normal.

Inasmuch as the dredging apparatus will be operated in different localities where operating conditions are different, it is desirable to provide means for adjusting the control mechanism to different vacua or pressures to be maintained at the pump inlet. A change in vacuum setting of the control mechanism is effected by the switch 49 controlling the motor 48 which revolves the gear 46 through the worm 47. The rotation of the gear 46 moves the spring nut 43 upwardly or downwardly according to direction of rotation. By moving the spring nut 43 downwardly, the control mechanism is adjusted for increased vacuum, or decreased pressure, in the conduit 13, since increased bias on the lever 48 is required to offset the increased tension of the spring 41.

By moving the spring nut 43 upwardly, the control mechanism is adjusted for decreased vacuum, or increased pressure, in the intake conduit 13, since a decreased bias on the lever 38 is required to balance the spring 41.

The control mechanism may also be adjusted for different pressures at the discharge opening 15. By turning the hand wheel 62 to raise the spring-holding member 58, an increased pressure is required to move the knife-edge 63 to a given position against the force of the spring 56. To provide a decreased pressure setting, the spring-holding member is moved downwardly, so that a lower discharge pressure effects a given position of the knife-edge 63.

It is to be understood that the cutter 18 is but one form of loosening means, and that my invention is not to be construed as limited to a cutter. The invention contemplates reducing the action of any loosening means known in the art in response to decrease in absolute pressure in the intake conduit.

From the above description it will be seen that I have greatly improved the operation of dredging apparatus by providing substantially uniform concentration of the solid material conveyed by the water through the intake and discharge conduits. This reduces extreme variations in vacuum and vibrations caused thereby, and it also eliminates plugging of the intake and discharge conduits. The elimination of plugging of the conduits eliminates much loss of time otherwise consumed in clearing the conduits when they are plugged.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a hydraulic dredging apparatus, the combination of a dredge pump, a conduit for conveying the material being dredged to the inlet of the pump, means disposed adjacent the mouth of said conduit for loosening the material, and means responsive to decrease in pressure in said conduit for retarding the action of the loosening means.

2. In a hydraulic dredging apparatus, the combination of a dredge pump, a conduit for conveying the material being dredged to the inlet of the pump, means disposed adjacent the mouth of said conduit for loosening the material, and means responsive to the pressure in said conduit for controlling the action of the loosening means.

3. In a hydraulic dredging apparatus, the combination of a dredge pump, an intake conduit connected with the inlet opening of the pump for conveying the material being dredged to the pump, a discharge conduit connected to the discharge opening of the pump, means disposed adjacent the mouth of the intake conduit for loosening the material, and means responsive to pressure in one of said conduits for controlling the action of the loosening means.

4. In a hydraulic dredging apparatus, the combination of a dredge pump, an intake conduit connected to the inlet opening of the pump for conveying the material being dredged to the pump, a discharge conduit connected to the discharge opening of the pump, means disposed adjacent the mouth of the intake conduit for loosening the material, and means responsive to a predetermined pressure in one of said conduits occasioned by a condition tending to obstruct the conduit for retarding the action of the loosening means.

5. In a hydraulic dredging apparatus, the combination of a dredge pump, an intake conduit connected with the inlet opening of the pump for conveying the material being dredged to the pump, a discharge conduit connected to the discharge opening of the pump, a cutter disposed adjacent the mouth of the intake conduit for loosening the material, means for driving said cutter, and means responsive to a predetermined pressure in one of said conduits occasioned by a condition tending to obstruct the conduit for reducing the speed of the cutter and its driving means.

6. In a hydraulic dredging apparatus, the combination of an intake conduit for removing the material being dredged, a cutter disposed adjacent the mouth of said conduit for loosening the material, and means responsive to the pressure in said conduit for controlling the speed of the cutter, the speed being decreased upon decrease in pressure.

7. In a hydraulic dredging apparatus, the combination of a drege pump, an intake conduit for conveying the material being dredged to the inlet of the pump, a cutter for loosening the material, means for driving said cutter, and means responsive to decrease in pressure in said conduit for reducing the speed of the cutter and its driving means.

8. In a hydraulic dredging apparatus, the combination of a dredge pump, an intake conduit for conveying the material being dredged to the inlet of the pump, a cutter disposed adjacent the mouth of said conduit for loosening the material, a prime mover for driving said cutter, speed governing means for said prime mover, and means responsive to the pressure in said conduit for modifying the action of said speed governing means to provide decreased speed upon decrease in pressure in said conduit.

9. In a hydraulic dredging apparatus, the combination of a dredge pump, an intake conduit for conveying the material being dredged to the inlet of the pump, a cutter disposed adjacent the mouth of said conduit for loosening the material, means for driving said cutter, and means responsive to a condition of the material in said conduit occasioned by tendency to plug the conduit for reducing the speed of the cutter and its driving means.

In testimony whereof, I have hereunto subscribed my name this 26th day of February, 1931.

CLARENCE H. BRUNNER.